United States Patent
Hofmann et al.

(10) Patent No.: US 7,267,361 B2
(45) Date of Patent: Sep. 11, 2007

(54) AIRBAG ASSEMBLY MOUNTING SYSTEM

(75) Inventors: Volker Hofmann, Frankfurt (DE);
Bernhard Schmidt, Maintal (DE); Med Merzouk, Gross-Gerau (DE); Matthias Volkmann, Kronberg/Ts (DE); Joachim Verheugen, Pfungstadt (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 337 days.

(21) Appl. No.: 11/078,042

(22) Filed: Mar. 14, 2005

(65) Prior Publication Data

US 2005/0225061 A1    Oct. 13, 2005

(30) Foreign Application Priority Data

Apr. 7, 2004    (DE) .................. 10 2004 017 188

(51) Int. Cl.
*B60R 21/16* (2006.01)
(52) U.S. Cl. .................. 280/728.2; 24/293; 24/458
(58) Field of Classification Search ............ 280/728.2, 280/730.2; 24/293–295, 458
See application file for complete search history.

(56) References Cited

U.S. PATENT DOCUMENTS

| | | | | |
|---|---|---|---|---|
| 1,229,668 A * | 6/1917 | Soltysik et al. | ............ | 451/163 |
| 2,265,957 A * | 12/1941 | Tinnerman | .................. | 24/295 |
| 2,670,512 A * | 3/1954 | Flora | ............................ | 24/289 |
| 2,692,414 A * | 10/1954 | Ougljesa | ...................... | 24/293 |
| 3,441,986 A * | 5/1969 | Pritchard | ................... | 248/74.2 |
| 4,595,325 A * | 6/1986 | Moran et al. | ................ | 411/173 |
| 5,873,690 A * | 2/1999 | Danby et al. | ................. | 411/55 |
| 6,095,734 A * | 8/2000 | Postadan et al. | ............ | 411/182 |
| 6,141,837 A * | 11/2000 | Wisniewski | .................. | 24/295 |
| 6,565,116 B1* | 5/2003 | Tajima et al. | ............. | 280/730.2 |
| 6,857,168 B2* | 2/2005 | Lubera et al. | ................. | 24/293 |
| 7,120,971 B2* | 10/2006 | Osterland et al. | ............. | 24/295 |
| 7,156,413 B2* | 1/2007 | Fischer et al. | ........... | 280/728.2 |
| 2003/0164607 A1 | 9/2003 | Ronne et al. | | |
| 2004/0040124 A1 | 3/2004 | Lubera et al. | | |

FOREIGN PATENT DOCUMENTS

| | | |
|---|---|---|
| DE | 198 12 737 A1 | 5/1999 |
| EP | 0 980 796 A | 2/2000 |
| EP | 1 291 534 A | 3/2003 |

* cited by examiner

*Primary Examiner*—Paul N. Dickson
*Assistant Examiner*—Drew J. Brown
(74) *Attorney, Agent, or Firm*—Lonnie Drayer

(57) ABSTRACT

A fastener for fastening an airbag assembly to a structural member of a vehicle has an abutment element with a front side and a reverse side. An expansion element is arranged on the reverse side of the abutment element and is designed so as to clamp the structural member between the abutment element and the expansion element. The expansion element can be arranged on the structural member of the vehicle in a detachable manner and from the front side can be directly or indirectly detached from the structural member with the help of unlocking means.

14 Claims, 5 Drawing Sheets

AIRBAG ASSEMBLY MOUNTING SYSTEM

FIELD OF THE INVENTION

The present invention relates to a fastener for fastening an airbag assembly to a structural member of a vehicle.

BACKGROUND OF THE INVENTION

Fasteners for fastening airbag assemblies to vehicles are known from the prior art. US 2003/0164607 A1 discloses a clamp-like fastener that engages a hole or an opening of a structural member of a vehicle. A base plate of the fastener comprises an opening with a thread, in which a screw can be screwed, to fasten an airbag assembly to the fastener. This is necessary in order to remove the airbag assembly from the structural member of the vehicle, since after the deployment of the airbag it must be replaced by a new airbag. There is, however, a problem in that the fastener engages the structural member of the vehicle in a non-detachable manner. In the event of replacement of an airbag, the fastener remains engaged with the structural member. An elaborate fastener is thus required, which must be provided with a stable and secure thread.

SUMMARY OF THE INVENTION

There is provided in accordance with the present invention, a fastener for fastening an airbag assembly to a structural member of a vehicle comprising an abutment element with a front side and a reverse side, which acts as a stop surface, an expansion element, which is arranged on the reverse side and designed so as to clamp a structural member between the stop surface and the expansion element, whereby the expansion element can be arranged on the structural member in a detachable manner and from the front side can be directly or indirectly detached from the structural member with the help of unlocking means. In this case the airbag assembly is advantageously arranged between the reverse side of the abutment element and the structural member, i.e. clamped between the latter two. The fastener can be used to fasten the airbag of the airbag assembly, or it can be used to fasten the housing or another component of the airbag assembly to the structural member of the vehicle. The expansion element is arranged on the reverse side of the abutment element, i.e. on a side that in an assembled state is essentially not visible (in particular within a closed frame shape). Due to the characteristic features of the expansion element the latter exerts a force on the structural member of the vehicle essentially in the direction of the reverse side of the abutment element, so that a region of the airbag arranged between the structural member and the abutment element is caught therein or clamped with it. In this manner a secure fastening of the airbag assembly to the structural member is advantageously achieved. With the help of unlocking means, which are arranged directly on the fastener or are part of the fastener or act directly from the outside (i.e. from the accessible side of the fastener) onto the expansion element, the fastener can be arranged to the structural member in a detachable, i.e. dismountable, manner. In other words, a fastener according to the present invention can engage a closed structural member and can be unlocked again from outside the closed structural member, enabling a multiple use of the fastener. According to the invention, the fastener thus with its stop surface, which is arranged essentially outside the insertion hole of the structural member, comes into contact with the insertion hole, whereby due to the restoring capability of the expansion element inside the insertion hole the bias of the fastener with the structural member is maintained.

DETAILED DESCRIPTION OF THE INVENTION

Figure 1A:
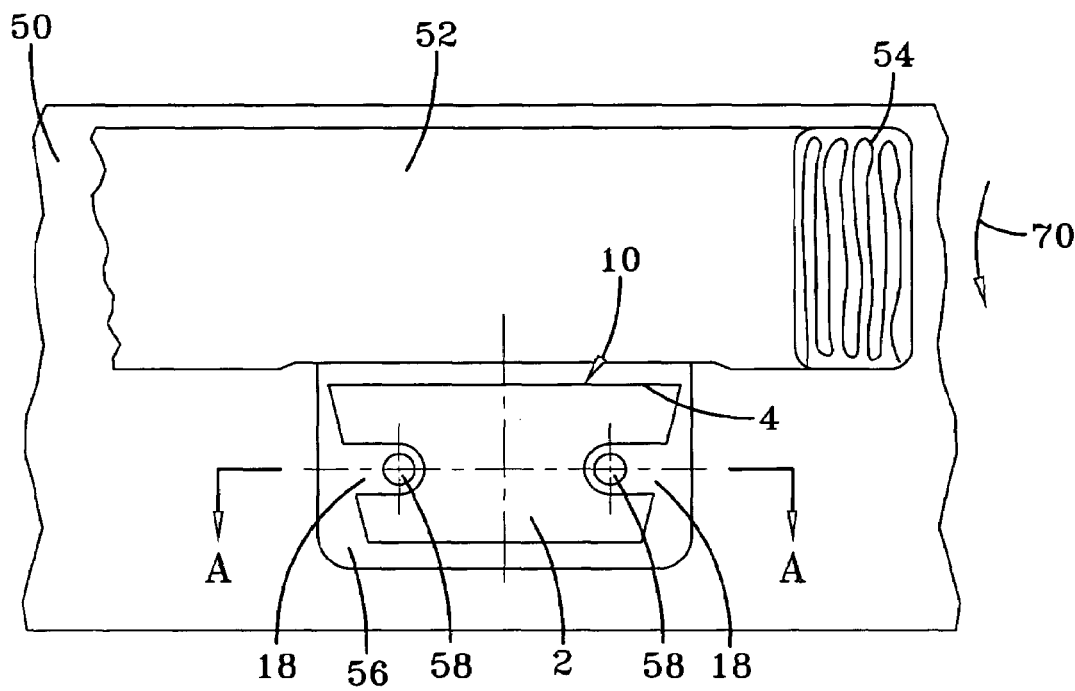
FIG. 1A is a front view of a first embodiment of a fastener according to the invention in a mounted state.

FIG. 1A shows a fastener 10 according to the invention assembled with a structural member 50 of a vehicle. An airbag assembly comprises an airbag cover 52 in which an airbag 54 is accommodated. The present invention has particular utility for fastening a curtain airbag assembly to a structural member 50 of a vehicle, which is a roof rail. A curtain airbag is an airbag that can be deployed to be interposed between a vehicle occupant and the laterally extending portions of a vehicle such as the side windows and roof supporting pillars of the vehicle. An integral component of the airbag cover 52, or a separate part attached thereto, provides a tab 56, by means of which the airbag assembly is fastened to the structural member 50 of the vehicle. The fastening of the airbag assembly to the structural member is achieved by the tab 56 being clamped between an abutment element 2 of the fastener 10 and the structural member 50 of the vehicle. Slots 18 in the abutment element 2 are aligned with passageways 58 in the structural element 50 of the vehicle for an unlocking means used for dismounting the airbag module from the structural member 50 of the vehicle. The airbag assembly is preferably fastened in such a manner that, in the embodiment shown in FIG. 1A, the airbag cover 52 is folded downward as indicated by arrow 70, after the installation of the fastener 10. In this embodiment it is particularly advantageous if at least an edge 4 of the abutment element 2, around which the tab 56 is folded, is rounded off. In this manner it can be ensured that the regions of the airbag assembly engaging the fastener are not damaged, whereby the force exerted on the airbag assembly is distributed over a large surface due to the plate-shape of the abutment element.

Figure 1B:
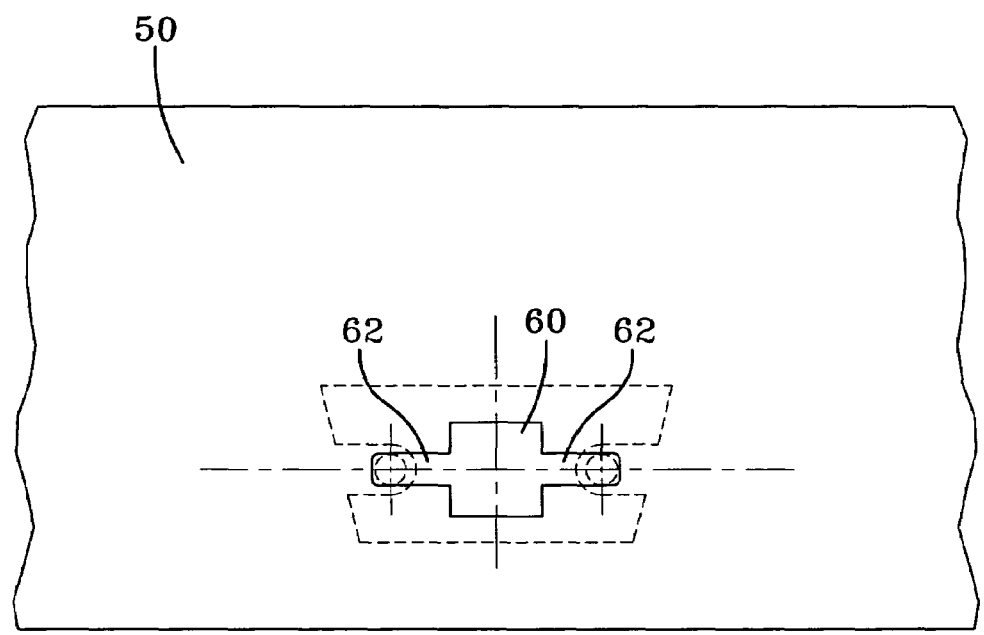
FIG. 1B is a front view of an opening in the structural member in which the fastener according to the invention is inserted.
Figure 3:
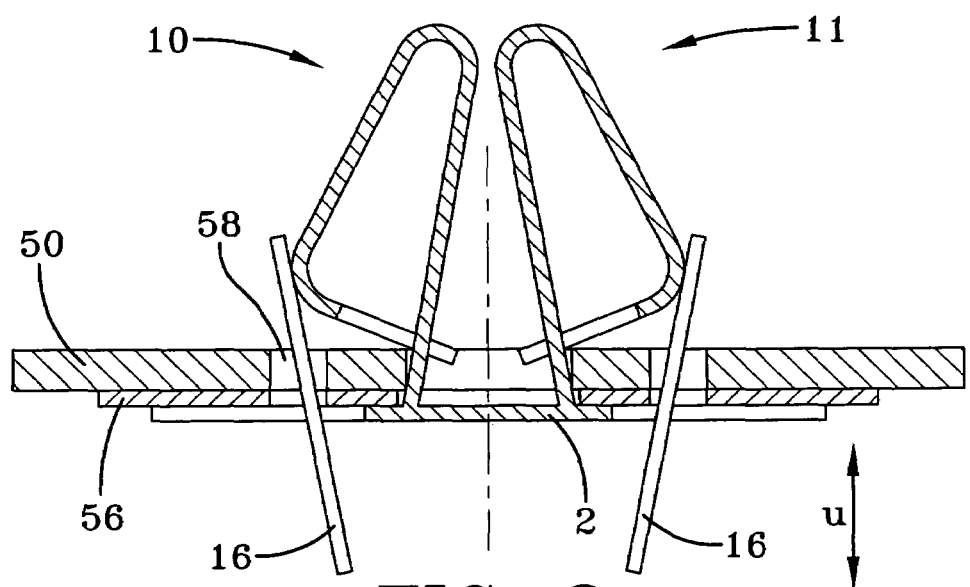
FIG. 3 is a sectional view along line A-A of FIG. 1 during the dismounting of the fastener.

FIG. 1B shows the structural member 50 of the vehicle without the airbag. The structural member 50 of a vehicle has an opening 60 therein into which a fastener will be inserted. The opening 60 is preferably rectangular in shape, but can have any other configuration complementary to the fastener or the abutment member that is shown in phantom. Slots 62 in the structural member 50 extend from opposing sides of the opening 60, and are positioned essentially to align with corresponding regions of the fastener. The slots 62 can be an integral component of the opening 60, as shown in FIG. 1B, or they can be arranged separately and adjacent thereto in the shape of a passageway 58 for an unlocking means. The configuration of the slots 62 can be freely designed, whereby it must be ensured that through the slots can co-operate with the unlocking means 16, as shown in FIG. 3, can be inserted into the structural member 50. Due to these slots, elongated unlocking means such as screwdrivers or pointed pliers for instance can be inserted into a region of the fastener which, seen from the mounting side of the fastener, lies behind the frame element. The regions of the expansion element located there can thus be pressed together or moved towards one another, to detach their engagement with the frame element or the structural member and to remove the fastener from the structural member of the vehicle.

A first embodiment of a fastener 10 according to the invention is now described in more detail with reference to FIGS. 2 and 3. The fastener 10 comprises an abutment element 2 with a front side 6 and a reverse side 8. Extending from the reverse side 8 of the abutment element 2 is an expansion element 11, which is designed to engage the structural member 50 of a vehicle. In other words, the reverse side 8 of the abutment element 2, acting as a stop surface, and the expansion element 11 act upon one another in such a manner that the structural member 50 and the tab 56 of the airbag assembly are clamped therebetween. Furthermore at least one of the front 6 and/or reverse sides 8 of the abutment element 2 is advantageously provided with a means for adhering to the airbag cover and/or the structural member of the vehicle. This can for instance be a glue or a Velcro fastener, with the aim of creating a pre-securing of the fastener to the part of the airbag assembly which is to be fastened.

The expansion element 11 comprises at least two spring arms having at least two essentially symmetrical first legs 12, which starting from the reverse side 8 of the abutment element 2 extend away from the latter and are positioned relative to one another such that in a cross section they converge like a V pointing away from the reverse side 8 the abutment element 2. Bent back preferably by an angle of approximately 180°, in each case are second legs 14 that extend from the first legs 12. The second legs 14 diverge from one another as they approach the reverse side 8 of the abutment element 2. The ends of the second legs 14 can be bent by approximately 90° at a location that will be close to the reverse side 8 of the abutment element 2 such that portions of the second legs 14 point towards one another, whereby in the region of said angles of each second leg 14 comprises a preferably arcuate bend, to enable a springing towards one another of the second legs 14. Additionally or alternatively, however, the bends can also be provided in the first legs 12. It must merely be ensured that the second legs 14 can move in relation to one another.

In other words, on the reverse side of the abutment element 2, spring legs 12 creating a V shape are positioned, which, at their point of contact or at the point of the shortest distance to one another, are essentially bent away from one another, back in the direction of the reverse side. At their end regions, which are close to the reverse side of the abutment element, they are preferably angled at approximately 90° to one another, whereby at least in the region of said angles either each second leg and/or each first leg comprises a bend, to enable a resilient relative movement of the first and second legs to one another. The regions of the second legs angled at approximately 90° are preferably used as engagement or abutment regions of the expansion element for or on the structural member.

Figure 2:
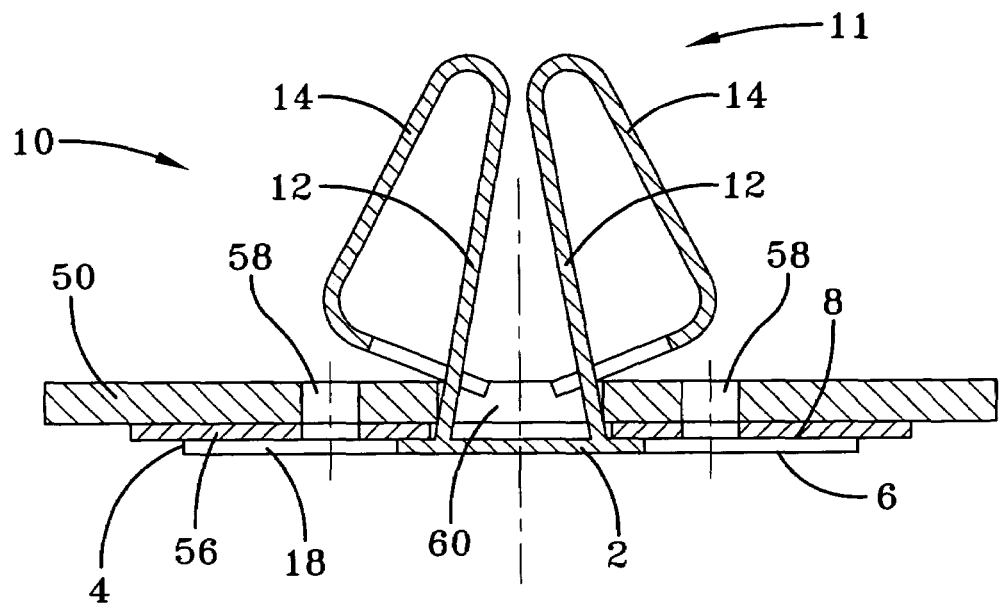
FIG. 2 is a sectional view along line A-A of FIG. 1 with the fastener in its' operative orientation.

The embodiment of the fastener shown in FIGS. 2 and 3 comprises an expansion element 11, which can be indirectly dismantled using unlocking means 16. These unlocking means can for instance be pointed pliers or corresponding rod-shaped elements, such as screwdrivers. The unlocking means reach through slots 18 of the abutment element 2, which are arranged opposite or adjacent to at least one part of the regions of the expansion element 11, which engage the structural member 50 (in this case the 90° angled regions of the second leg 14). Opposite or in alignment with the slots 18, passageways 58 for the unlocking means 16 are arranged in the structural member 50 to enable the passage of the unlocking means 16 for contacting the second legs 14 of the expansion element 11. After at least the second legs 14 of the expansion element 11 have been moved towards one another with the help of the unlocking means 16 to such an extent that the greatest distance between the second legs 14 equals the size of the opening 60 in the structural member 50, through which the fastener reaches, the fastener can be removed in the mounting and dismounting direction u. In FIG. 3, the mounting and dismounting direction u is essentially parallel to the axis of symmetry of the first legs 12 creating the V-shape. The direction u is therefore preferably essentially perpendicular to the reverse side 8 of the abutment element 2. In other words, the fastener is thus inserted in or withdrawn from a corresponding opening or insertion hole in the structural member in a direction which is essentially perpendicular to the stop surface of the abutment element. The expansion element advantageously comprises resilient regions, i.e. the first legs and/or the second legs, which during assembly of the fastener are positioned in one direction essentially transverse to the mounting or dismounting direction and move in a resilient manner to one another and away from one another.

Figure 4:
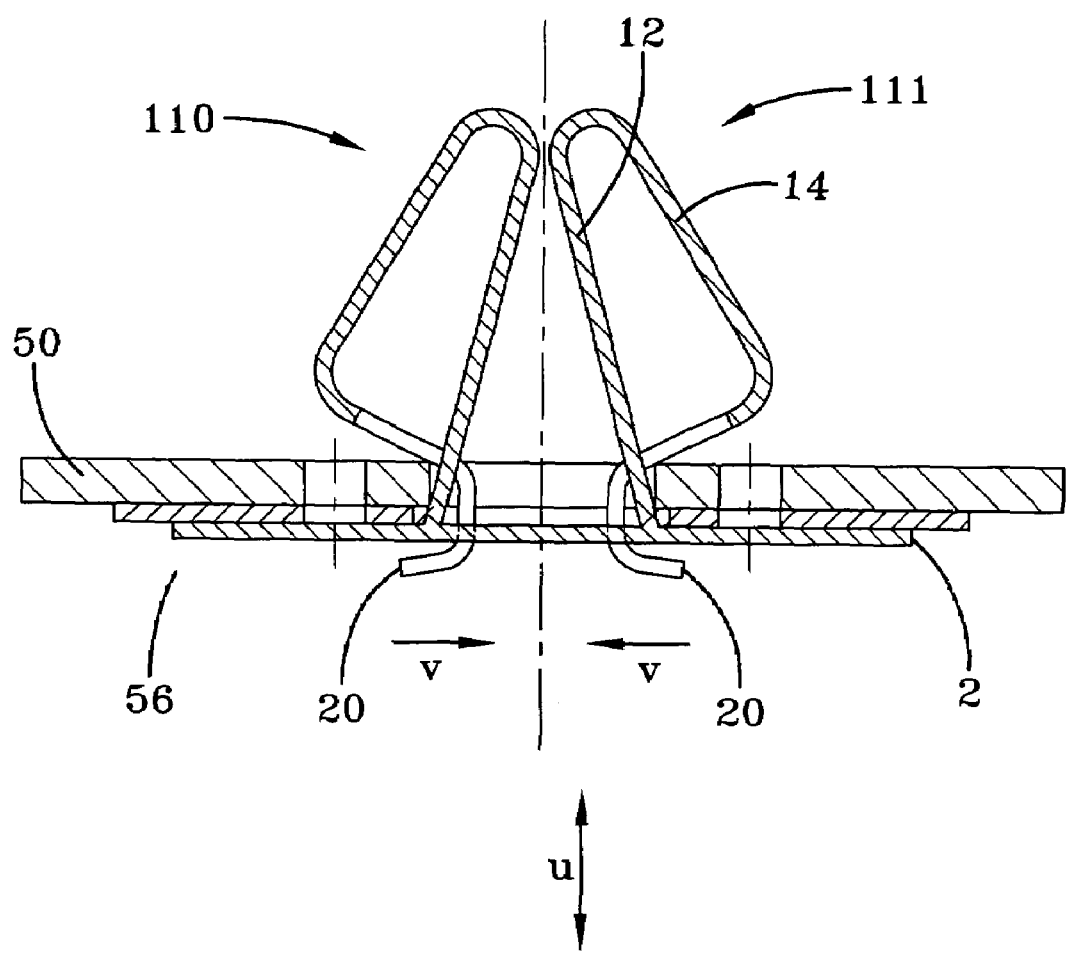
FIG. 4 is a sectional view of a second embodiment of the fastener according to the invention.

FIG. 4 shows a second embodiment of a fastener 110 according to the invention, whereby the parts identical to the first embodiment carry the same reference numerals. In contrast to the first embodiment, the expansion element 111 comprises at least one unlocking section 20 that projects beyond the front side 6 of the abutment element 2. The unlocking section 20 is preferably a continuation of at least one of the second legs 14, which thus projects through the opening 60 of the structural member 50 over the front side 6 of the abutment element 2, in order to be operated by hand or by means of pliers. The unlocking section 20 can be arranged on one of the second legs 14 or on both the second legs 14, as well as on one of the two first legs 12, as long as it is possible by means of the unlocking section 20 to move the second legs 14 towards one another in such a manner that the second legs 14 can be brought out of engagement with the structural member 50. This occurs in the present embodiment in that the unlocking sections 20 are moved towards one another in the direction of the arrows v to the extent that the fastener can be removed from the structural member 50 in the direction u. It is thus advantageously not required to provide further unlocking means that act upon the expansion element, since due to the unlocking sections the expansion element is directly acted upon The abutment element 2 is furthermore preferably designed so as to exert a force indirectly or directly on the structural member 50 against the mounting direction. The force is essentially greater than the friction force between the structural member and the expansion element or the forces exerted by the expansion element on the structural member in the mounting direction during the mounting process, but smaller than the forces exerted by the expansion element on the structural member in the mounting direction after the correct insertion or mounting of the fastener. In other words, the fastener, due to this spring effect, can engage the structural member of the vehicle only if said spring effect is overcome during the mounting of a fastener in an opening or a hole in the structural member. Consequently an error avoidance measure is created, by which a safe mounting of the airbag assembly to the vehicle frame is ensured. In addition, possible permissible variations between the fastener, the structural member and the part of the airbag assembly arranged in between can be balanced out through the direct or indirect restoring capability of the abutment element.

Figure 5C:
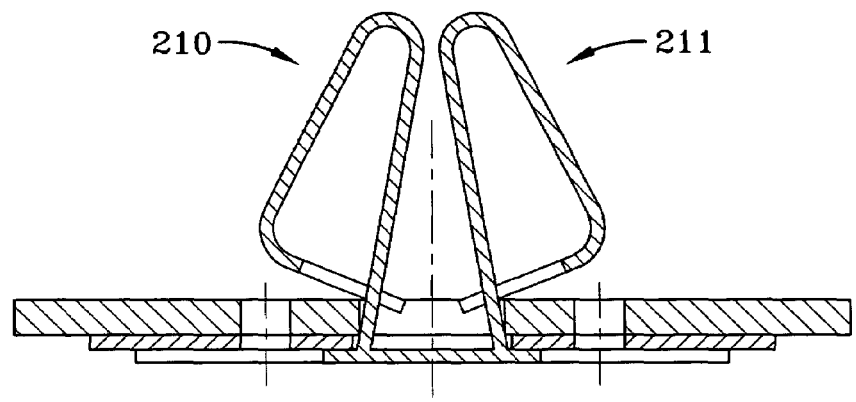
FIGS. 5A-5C are sectional views of a third embodiment of the fastener according to the invention showing stages of the insertion of the fastener to a vehicle structure.
Figure 5B:
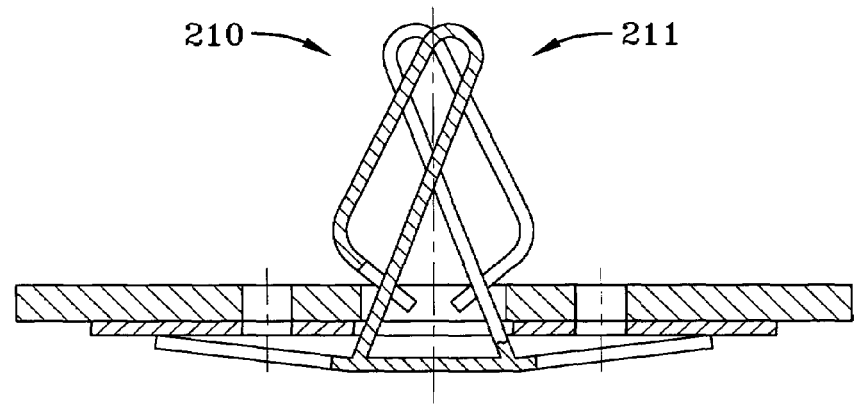
Figure 5A:
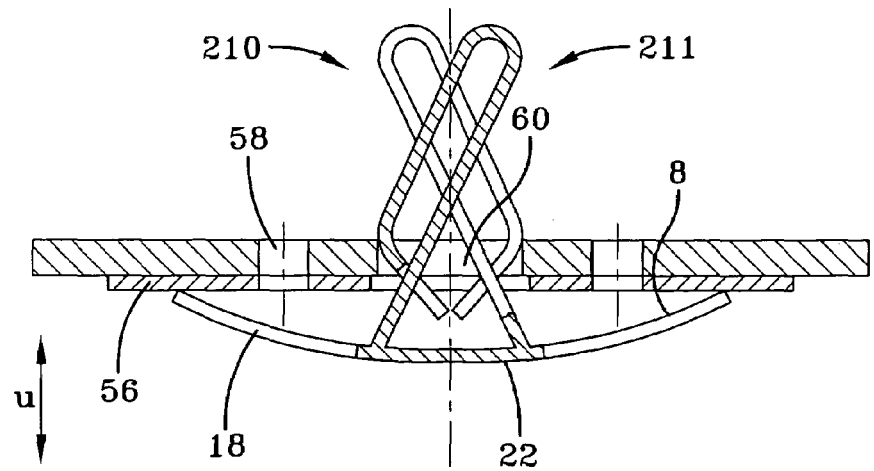

At least the reverse side of the abutment element is preferably formed in a resilient manner, preferably due to a concave surface configuration of the stop surface. FIGS. 5A-5C show a third embodiment of a fastener 210 according to the invention during its mounting, whereby the parts identical to the first embodiment carry the same reference numerals. The fastener 210 comprises an abutment element 22, which is essentially plate-shaped and displays a concave reverse side 8. The abutment element can in this case be resiliently arched along an axis, i.e. forming the part of an inner surface of a cylinder, display a spherical configuration or any other resilient shape, by means of which a force can be exerted on the structural member as seen from the fastening side. The abutment element 22 is made out of a resilient material, in order to exert a force on the structural member 50 against the mounting direction u. Consequently, due to the spring effect acting additionally from the outside, i.e. from the mounting side, between the abutment element 22 and the frame element 50, the fastener 210 can engage the structural element 50 of the vehicle only if said spring effect is overcome during the insertion of the fastener 210 in the opening 60. In other words, the expansion element 211 can only expand into its final position when the fastener 210 is inserted sufficiently deeply into the opening 60. To ensure a slipping out in the case of a not entirely engaged fastener, the outer edge of the abutment element 22, i.e. in particular the region which is the first to enter into contact with the frame element 50, already displays a slight tension towards the frame element 50, when the regions of the second leg 14 which are bent back by essentially 90° just touch the edge region of the opening 60 (compare FIG. 5 left). It can thus be ensured that the fastener 210 is correctly inserted, since in the event of an incomplete mounting of the fastener, the latter is pushed out of the structural member 50 and thus displays the incorrect mounting.

Figure 6:
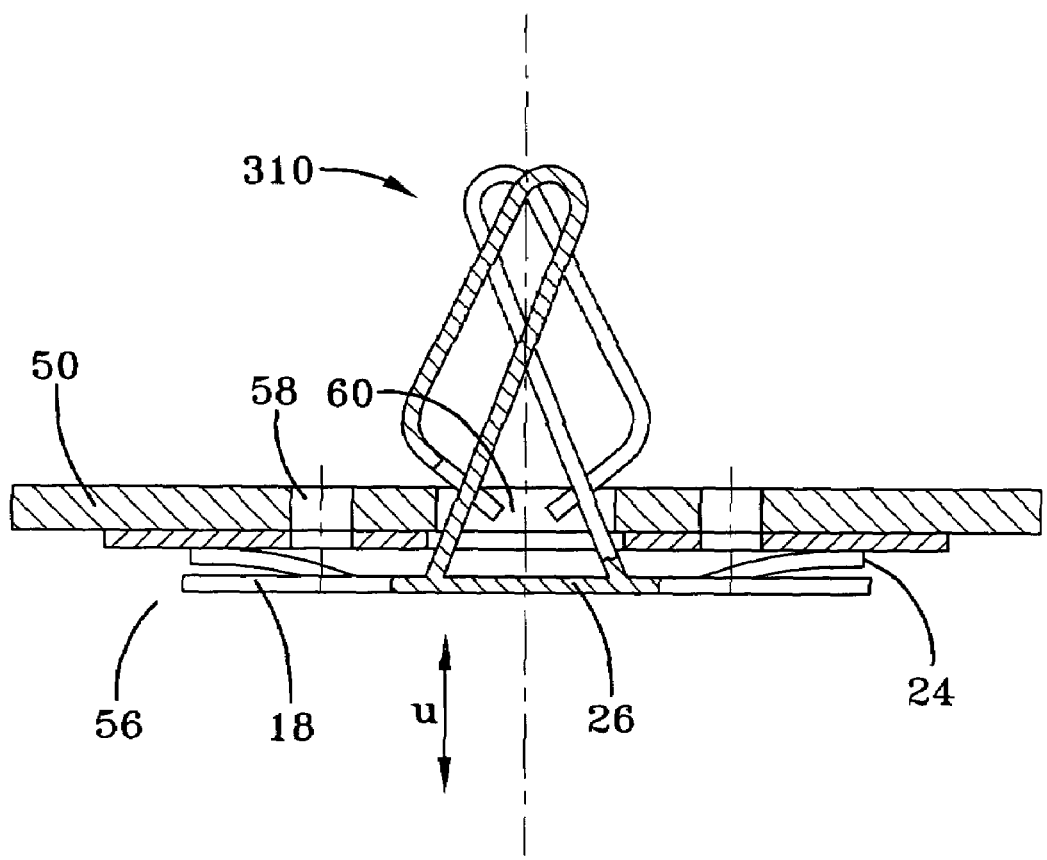
FIG. 6 is a sectional view of a fourth embodiment of the fastener according to the invention.

FIG. 6 shows an alternative embodiment to the third embodiment of a fastener 310 according to the invention, whereby the resilient effect is achieved by additional spring elements 24 arranged on the reverse side 8 of the abutment element 26. The spring elements 24 can display the shape of spring straps distanced from one another, and can be made of a resilient material, such as thin sheet metal, for instance. Alternatively or additionally, other resilient elements, such as a rubber or elastomer block for instance, can be provided on the reverse side 8 of the abutment element 26.

The provision of a fastener 210, 310 in accordance with the third or fourth embodiment also ensures that permissible variations between the fastener, the tab 56 and the structural member 50 are balanced out by the spring effect.

While specific preferred embodiments and materials have been illustrated, described and identified, it is to be understood that the invention is in no way limited thereto since modifications may be made and other embodiments of the invention will occur to those of skill in the art to which this invention pertains. Thus, it is intended to cover any such modifications and other embodiments as incorporated the features of this invention within the full lawful scope of the allowed claims as follows.

We claim:

1. An airbag assembly mounting system comprising: a fastener having an abutment element with a front side and a reverse side, an expansion element is arranged on the reverse side of the abutment element and extends through an opening in a structural member of a vehicle so as to clamp the structural member of a vehicle and a component of an airbag or an airbag cover between the reverse side of the abutment element and the expansion element, wherein the expansion element comprises at least two spring arms that comprise two essentially symmetrical first legs originating or starting from a reverse side of the abutment element and extending from the reverse side of the abutment element when viewed in cross section, the first legs converge to a point of contact or at a point of shortest distance to one another to an end region of each first leg to form an essentially V-shape, from the end regions of which second legs extend toward the reverse side of the abutment element, the second legs diverging from one another toward the reverse side of the abutment element to an end of each second leg that is bent such that the end portions of each second leg point towards one another to be used as engagement or abutment regions of the expansion element for or on the structural member, whereby the expansion element can be arranged on the structural member in a detachable manner and from the front side can be directly or indirectly detached from the structural member using unlocking means.

2. The airbag assembly mounting system according to claim 1, wherein the mounting and dismounting direction of the fastener preferably lies essentially parallel to an axis of symmetry of the first legs.

3. The airbag assembly mounting system according to claim 2, wherein the abutment element has passages therein aligned with passages in the structural member of the vehicle to facilitate the dismounting of the airbag assembly using unlocking means that pass through the aligned passages.

4. The airbag assembly mounting system according to claim 2, wherein the expansion element further comprises at least one unlocking section, which projects beyond the front side of the abutment element.

5. The airbag assembly mounting system according to claim 1, wherein the abutment element has passages therein aligned with passages in the structural member of the vehicle to facilitate the dismounting of the airbag assembly using unlocking means that pass through the aligned passages.

6. The airbag assembly mounting system according to claim 1, wherein the expansion element further comprises at least one unlocking section, which projects beyond the front side of the abutment element.

7. The airbag assembly mounting system according to claim 6, wherein the unlocking section is a continuation of at least one second leg.

8. The airbag assembly mounting system according to claim 4, wherein the unlocking section is a continuation of at least one second leg.

9. The airbag assembly mounting system according to claim 1, wherein the abutment element is made resilient by the reverse side of the abutment element adjacent the structural member of the vehicle being concave, or by the reverse side of the abutment element having a spring or a block of a resilient material associated therewith.

10. The airbag assembly mounting system according to claim 1, wherein the abutment element is provided with a means for adhering to at least one of the component of the airbag or the airbag cover and the structural member of the vehicle.

11. An airbag assembly mounting system comprising: a fastener having an abutment element with a front side and a reverse side, an expansion element is arranged on the reverse side and extends through an opening in a structural member of a vehicle to clamp the structural member of a vehicle and a component of an airbag or an airbag cover between the reverse side of the expansion element and the structural member of the vehicle, the abutment element has passages therein aligned with passages in the structural member of the vehicle to facilitate the dismounting of the airbag assembly using unlocking means that pass through the aligned passages; and wherein the expansion element comprises at least two essentially symmetrical first legs that start or originate from the reverse side of the abutment element and extend from the reverse side of the abutment element and are positioned relative to one another such that in a cross section they converge to a point of contact or at a point of shortest distance to one another to form essentially a V pointing away from the reverse side the abutment element, each first leg being bent back to form second legs that extend from the first legs, the second legs diverging from one another as the second legs approach the reverse side of the abutment element.

12. The airbag assembly mounting system according to claim 11, wherein the reverse side of the abutment element adjacent the structural member of the vehicle is concave.

13. An airbag assembly mounting system comprising: an airbag assembly comprising an airbag cover in which an airbag is accommodated, the airbag cover having a tab extending therefrom; a fastener having an abutment element with a front side and a reverse side, an expansion element that comprises at least two essentially symmetrical first legs that orginate or start from the reverse side of the abutment element and extend from the reverse side of the abutment element and are positioned relative to one another such that in a cross section they converge to a point of contact or at a point of shortest distance to one another to form essentially a V pointing away from the reverse side of the abutment element, each first leg being bent back to form second legs that extend from the first legs, the second legs diverging from one another as the second legs approach the reverse side of the abutment element, the expansion element extends through an opening in the tab and an opening in a structural member of a vehicle to clamp the tab between the reverse side of the expansion element and the structural member of the vehicle, the abutment element has passages therein aligned with passages in the structural member of the vehicle to facilitate the dismounting of the airbag assembly using unlocking means that pass through the aligned passages.

14. The airbag assembly mounting system according to claim 13, wherein the reverse side of the abutment element adjacent the structural member of the vehicle is concave.

* * * * *